(12) United States Patent
Su

(10) Patent No.: US 9,120,635 B2
(45) Date of Patent: Sep. 1, 2015

(54) TURNING MECHANISM

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Rong-Chun Su, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 95 days.

(21) Appl. No.: 14/010,745

(22) Filed: Aug. 27, 2013

(65) Prior Publication Data
US 2014/0154040 A1    Jun. 5, 2014

(30) Foreign Application Priority Data

Dec. 4, 2012    (CN) ...................... 2012 2 0656801 U

(51) Int. Cl.
*B65H 15/00* (2006.01)
*B65G 49/06* (2006.01)
*B65G 47/252* (2006.01)

(52) U.S. Cl.
CPC .............. *B65H 15/00* (2013.01); *B65G 49/067* (2013.01); *B65G 47/252* (2013.01)

(58) Field of Classification Search
CPC .................................................... B65G 47/248
USPC ........... 190/403, 404, 617; 271/186; 414/754, 414/758, 761, 762, 763, 765, 766, 771, 773, 414/775, 776, 778, 783
See application file for complete search history.

(56) References Cited

U.S. PATENT DOCUMENTS

| | | | | |
|---|---|---|---|---|
| 4,050,574 A * | 9/1977 | Chenevard et al. | ........... | 198/458 |
| 4,141,457 A * | 2/1979 | Nocek | ........... | 414/737 |
| 4,381,170 A * | 4/1983 | Orii | ........... | 414/758 |
| 4,533,291 A * | 8/1985 | Nishida | ........... | 414/728 |
| 4,564,332 A * | 1/1986 | Orii | ........... | 414/759 |
| 5,419,675 A * | 5/1995 | Hein | ........... | 414/771 |
| 7,909,156 B2 * | 3/2011 | Wen | ........... | 198/403 |
| 2011/0171001 A1 * | 7/2011 | Franz et al. | ........... | 414/783 |

* cited by examiner

*Primary Examiner* — Gregory Adams
(74) *Attorney, Agent, or Firm* — Novak Druce Connolly Bove + Quigg LLP

(57) ABSTRACT

A turning mechanism for turning over workpieces includes a supporting bracket, a turning assembly, and a suction assembly. The turning assembly includes a first driving member mounted on the supporting bracket and a turning member connected to the first driving member. The suction assembly includes a plurality of suction members and a second driving member connected to the plurality of suction members. The plurality of suction members is separately mounted on the turning member. The second driving member is mounted on the supporting bracket and is capable of generating negative air pressure in the plurality of suction members to enable the plurality of suction members to suction adhere to the workpiece, thereby holding the workpiece on the turning member. The first driving member is capable of rotating the turning member to turn over the workpiece.

19 Claims, 5 Drawing Sheets

TURNING MECHANISM

BACKGROUND

1. Technical Field

The present disclosure relates to a turning mechanism.

2. Description of Related Art

In industries, during manufacturing processes such as machining and assembling, workpieces are turned over to enable the back portion thereof to be facing the machine or to be assembled to other members. Human labor is employed to accomplish the turning or flipping over process. However, due to human error, the workpiece may be easily damaged.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
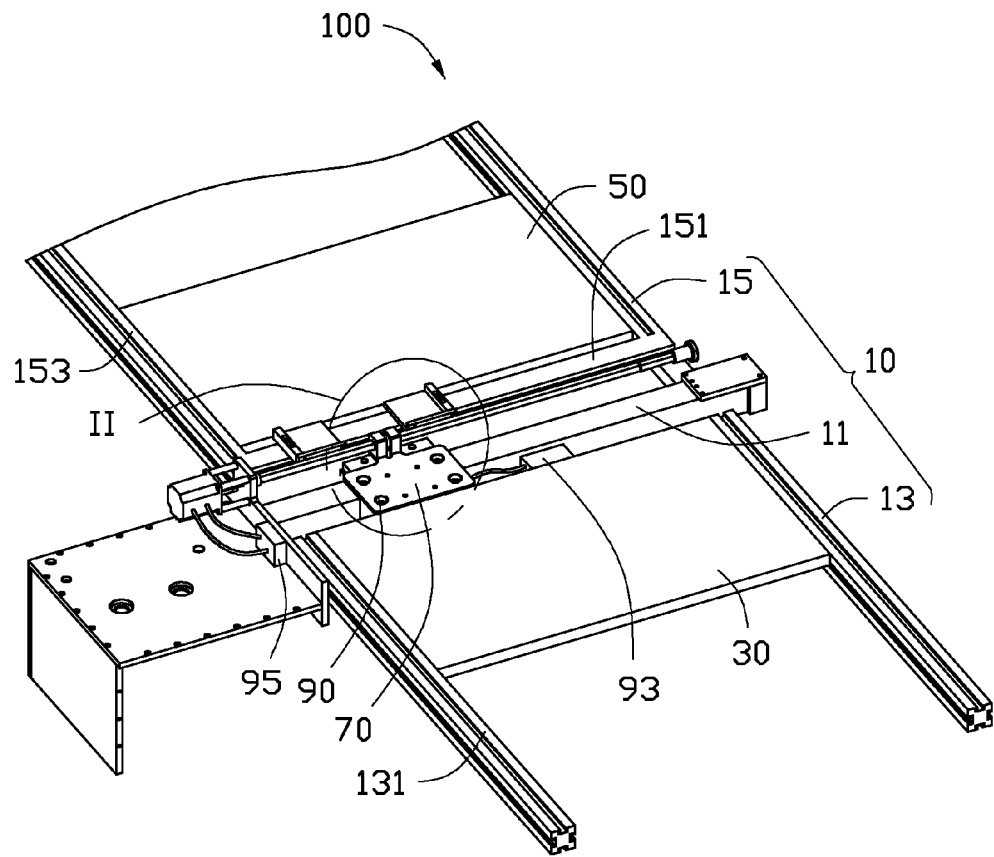
FIG. 1 is an isometric view of an embodiment of a turning mechanism, including a turning assembly.
Figure 5:
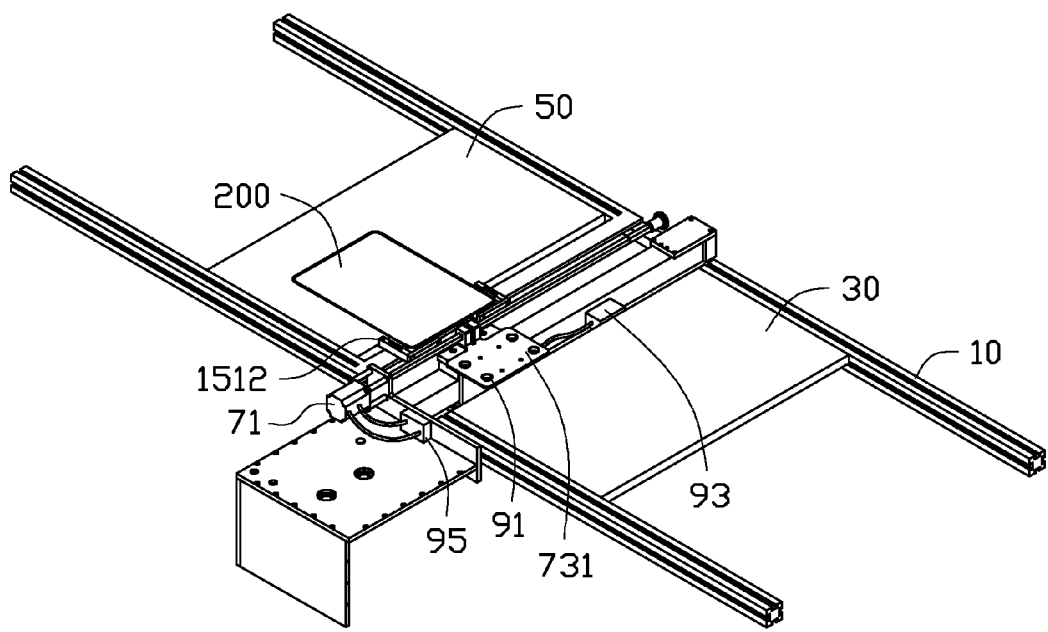
FIG. 5 is similar to FIG. 1, but shown in a using state.

FIG. 1 shows a turning mechanism 100 employed in a product manufacturing production line to turn or flip over one or more workpieces 200 (see FIG. 5). The turning mechanism 100 includes a supporting bracket 10, a first transferring pallet 30, a second transferring pallet 50, a turning assembly 70, a suction assembly 90, and a controller 95. The first transferring pallet 30 and the second transferring pallet 50 are configured opposite to each other and movably mounted on the supporting bracket 10. The turning assembly 70 is mounted on the supporting bracket 10 and is positioned between the first transferring pallet 30 and the second transferring pallet 50 for fetching and turning/flipping over the workpiece 200 from the first transferring pallet 30, and then releasing the workpiece 200 to be placed upon the second transferring pallet 50. The suction assembly 90 is mounted on the turning assembly 70 for providing suctioning to adhere or hold on to the workpiece 200. The controller 95 is mounted on the supporting bracket 10 and is electrically connected to the turning assembly 70 and the suction assembly 90. The controller 95 controls the suction assembly 90 to suction adhering to hold the workpiece 200 and controls the turning assembly 70 to turn or flip over the workpiece 200.

Figure 2:
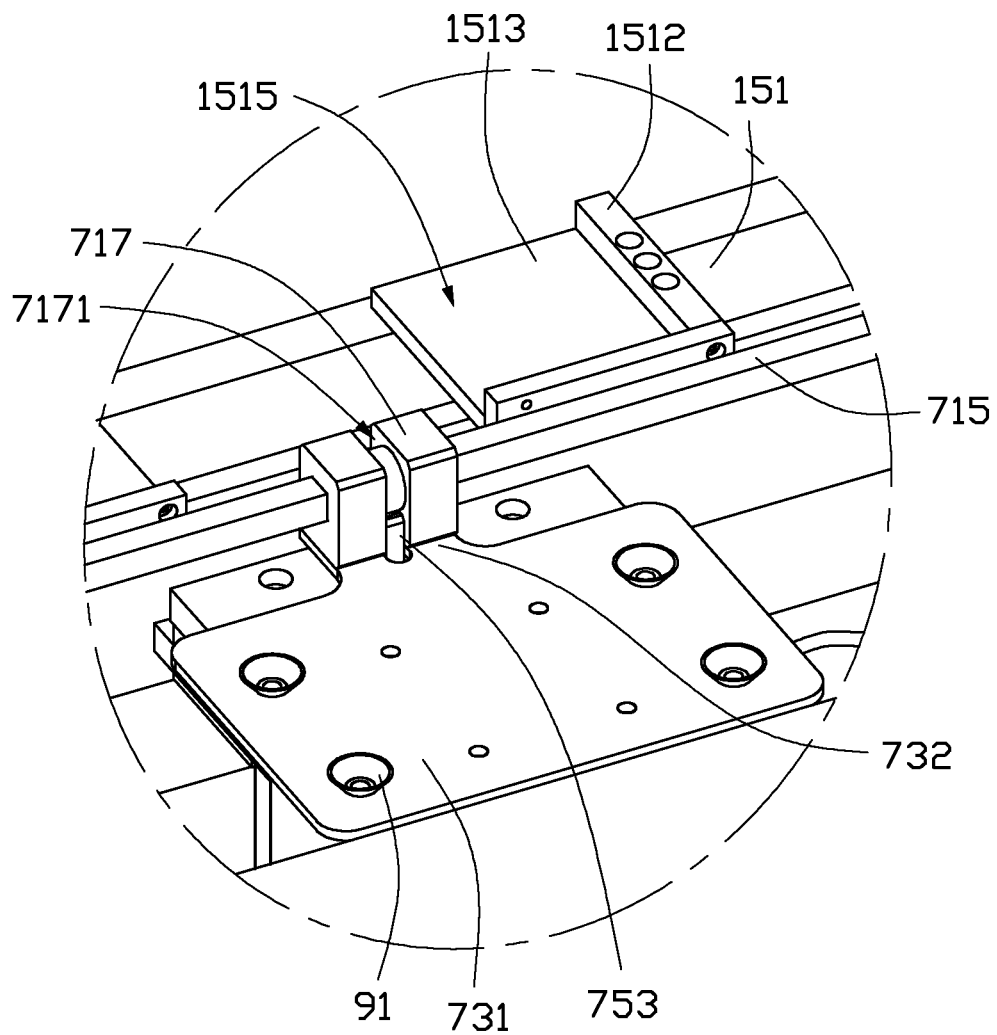
FIG. 2 is an enlarged view of a circled portion II of FIG. 1.

The supporting bracket 10 includes a base seat 11, a first support frame 13 and a second support frame 15. The base seat 11 is substantially a rectangular strip shape. The first support frame 13 and the second support frame 15 are assembled to opposite sides of the base seat 11. The first support frame 13 includes a pair of first supporting rods 131 extending from opposite ends of the base seat 11 toward one side of the base seat 11. The second support frame 15 includes a mounting plate 151 and a pair of second supporting rods 153. The pair of second supporting rods 153 extends from opposite ends of the base seat 11 toward a side of the base seat 11 opposite to the first support frame 13. The mounting plate 151 is arranged parallel to the base seat 11 and fixed to a side of the base seat 11. FIG. 2 shows that a pair of receiving portions 1512 is symmetrically mounted on the mounting plate 151. The pair of receiving portions 1512 is separated from each other. Each receiving portion 1512 defines a receiving groove 1513 configured to be facing the other receiving portion 1512. The two receiving grooves 1513 of the pair of receiving portions 1512 cooperatively form a receiving space 1515. The receiving space 1515 has a shape that is the same as that of the workpiece 200, and partially receives the workpiece 200.

The first transferring pallet 30 is supported by the pair of first supporting rods 131 and is slidably mounted on the first support frame 13. The first transferring pallet 30 is spaced from the base seat 11, and is used to transfer the workpiece 200 toward the turning assembly 70. The second transferring pallet 50 is supported by the pair of second supporting rods 153, and is slidably mounted on the second support frame 15.

Figure 3:
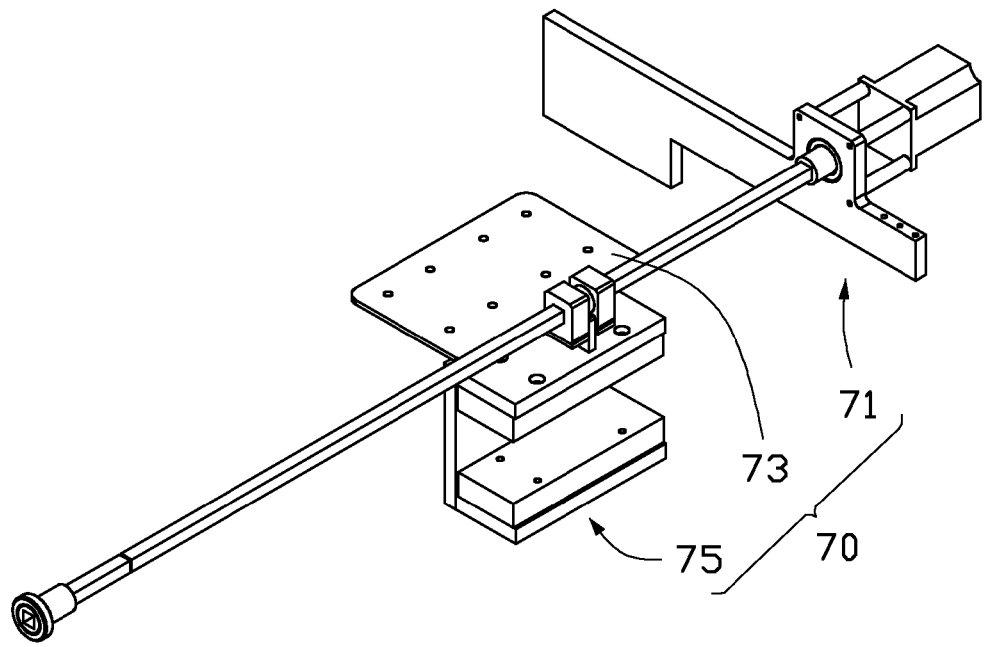
FIG. 3 is an assembled, isometric view of the turning assembly of the turning mechanism of FIG. 1.
Figure 4:
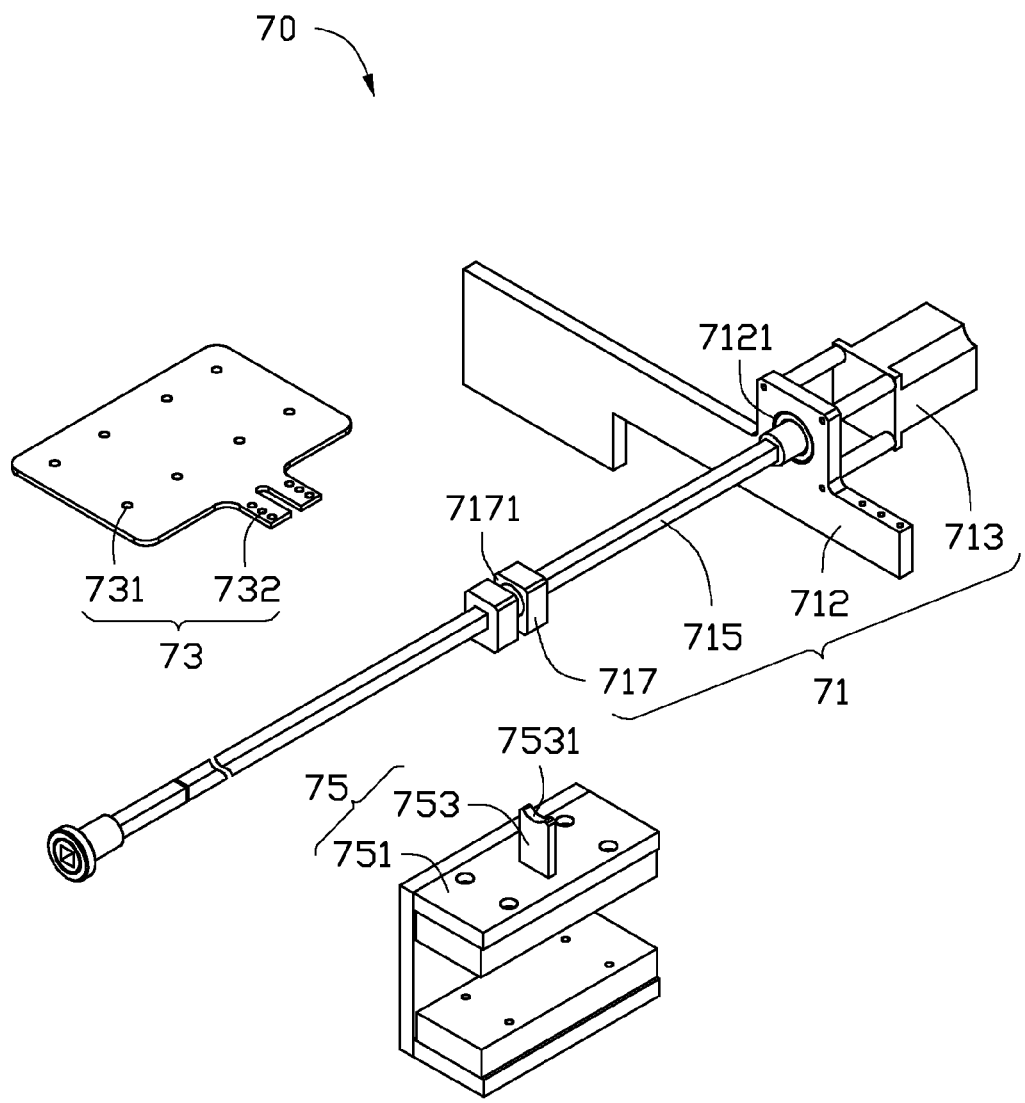
FIG. 4 is an exploded, isometric view of the turning assembly of the FIG. 2.

FIGS. 3 and 4 show that the turning assembly 70 is mounted on the base seat 11, and the turning assembly 70 includes a first driving member 71, a turning member 73, and a supporting member 75. The first driving member 71 is mounted on a side of the base seat 11 away from the first transferring pallet 30, and includes a fixing portion 712, a driving portion 713, a transmission rod 715 and a rotating member 717. The fixing portion 712 is fixed to an end of the base seat 11. Opposite ends of the fixing portion 712 fittingly connect to one of the first supporting rods 131 and one second supporting rod 153. The fixing portion 712 defines an extending hole 7121. The driving portion 713 is fittingly assembled to the fixing portion 712, and is aligned with the extending hole 7121. The transmission rod 715 is arranged parallel to the base seat 11; an end of the transmission rod 715 extends through the extending hole 7121, and is connected to the driving portion 713. The other end of the transmission rod 715 is supported by one second supporting rod 153. The rotating member 717 is movably sleeved on the transmission rod 715. The rotating member 717 is rotatable around the axis of the transmission rod 715 and slidable along an axial direction of the transmission rod 715.

The driving portion 713 drives the transmission rod 715 to rotate, thereby rotating the rotating member 717 around the axis of the transmission rod 715. The rotating member 717 defines an engaging groove 7171 along a peripheral surface thereof. The turning member 73 is connected to the rotating member 717 and is positioned at a side of the base seat 11. In the embodiment, the first driving member 71 is composed by a screwed leading rod and a nut. The turning member 73 is located between the base seat 11 and the first transferring pallet 30. A top surface of the turning member 73 is coplanar to the first transferring pallet 30. The turning member 73 includes a loading portion 731 and a pair of connecting portions 732 protruding from a side of the loading portion 731. The loading portion 731 is substantially a rectangular plate shaped for supporting the workpiece 200. The pair of connecting portions 732 is spaced from each other, and is fixed to the rotating member 717.

The supporting member 75 is slidably mounted on the base seat 11, and supports the rotating member 717. The supporting member 75 moves simultaneously following the rotating member 717 along the axial direction of the transmission rod 715. The supporting member 75 includes a main body 751 and a resisting portion 753 protruding from a side of the main body 751. The main body 751 is slidably mounted on the base seat 11, and the resisting portion 753 is partially received between the pair of connecting portions 732 and engages into the engaging groove 7171 of the rotating member 717, thereby supporting the rotating member 717. The resisting portion 753 defines a concave resisting surface 7531 at an end thereof away from the main body 751. The concave resisting surface 7531 is an arc surface and abuts against a bottom of the engaging groove 7171. When the end of the transmission rod 715 opposite to the driving portion 713 is fixed to the base seat 11, the supporting member 75 may be omitted.

The suction assembly 90 is partially mounted on the loading portion 731, and includes a plurality of suction members 91 and a second driving member 93 connected to the plurality of suction members 91. The plurality of suction members 91 are separately mounted on the loading portion 731 of the turning member 73. The second driving member 93 is mounted on the base seat 11, and is capable of generating negative air pressure in the plurality of suction members 91 to enable the plurality of suction members 91 to attract and suction to hold on to the workpiece 200.

The controller 95 is mounted on the supporting bracket 10, and is electrically connected to the driving portion 713 of the first driving member 71 and the second driving member 93. The controller 95 is capable of controlling the first driving member 71 to rotate the turning member 73, and the second driving member 93 to drive the plurality of suction members 91. If the first driving member 71 and the second driving member 93 are programmed to act or operate in a preset period, the controller 95 may be omitted.

When in assembly, the first transferring pallet 30 is slidably mounted on the pair of first supporting rods 131, and the second transferring pallet 50 is slidably mounted on the pair of second supporting rods 153. The first driving member 71 is mounted on a side of the base seat 11. The pair of connecting portions 732 of the turning member 73 is fixed to the rotating member 717. The supporting member 75 is slidably mounted on the base seat 11, and the resisting portion 753 of the supporting member 75 is partially received between the pair of connecting portions 732 and engages into the engaging groove 7171, thereby supporting the rotating member 717 by the concave resisting surface 7531.

When in use, the first transferring pallet 30 transfers the workpiece 200 toward the base seat 11 and positions the workpiece 200 on the turning member 73. The plurality of suction members 91 are suctioned onto the workpiece 200, thereby holding the workpiece 200 on the turning member 73. The driving portion 713 drives the transmission rod 715 to rotate the rotating member 717 to enable the turning member 73 to rotate the workpiece 200, the turning member 73 places the workpiece 200 on the receiving space 1515 of the second support frame 15. The workpiece 200 is partially supported by the second transferring pallet 50. The plurality of suction members 91 then releases the workpiece 200. Then, the first driving member 71 drives the turning member 73 to rotate and arrives at the original position. Simultaneously, the second transferring pallet 50 transfers the workpiece 200 from the receiving space 1515 to a next workstation.

The suction assembly 90 sucks to hold on to the workpiece 200 from the first transferring pallet 30, the turning assembly 70 turns or flips the workpiece 200 over relative to the supporting bracket 10. The suction assembly 90 releases the workpiece 200 onto the second transferring pallet 50. Therefore, the structure of the turning mechanism 100 is simpler and more labor efficient, thereby efficiency is enhanced.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A turning mechanism for turning over workpieces, comprising:
    a supporting bracket;
    a turning assembly comprising a first driving member mounted on the supporting bracket and a turning member connected to the first driving member; and
    a suction assembly comprising a plurality of suction members and a second driving member connected to the plurality of suction members;
    wherein the plurality of suction members are separately mounted on the turning member, the second driving member is mounted on the supporting bracket and capable of generating negative air pressure in the plurality of suction members to enable the plurality of suction members to suction-adhering the workpiece, thereby holding the workpiece on the turning member, the first driving member is capable of rotating the turning member to turn over the workpiece;
    wherein the first driving member comprises a fixing portion, a driving portion, a transmission rod and a rotating member, the fixing portion is fixed to supporting bracket, the driving portion is fittingly assembled to the fixing portion, the transmission rod extends through the fixing portion and is connected to the driving portion, the rotating member is movably mounted on the transmission rod, the driving portion drives the transmission rod to rotate the rotating member.

2. The turning mechanism of claim 1, wherein the fixing portion defines an extending hole thereon, the transmission rod extends through the extending hole to connect with the driving portion, the rotating member is sleeved on the transmission rod and capable of moving along an axial direction of the transmission rod.

3. The turning mechanism of claim 1, wherein the turning member comprises loading portion and a pair of connecting portions protruding from a side of the loading portion, the plurality of suction member is mounted on the loading portion, the pair of connecting portions is spaced from each other and fixed to the rotating member.

4. The turning mechanism of claim 1, further comprising a controller, wherein the controller is mounted on the supporting bracket and is electrically connected to the first driving member and the second driving member, thereby controlling the turning member to turn over the workpiece and controlling the plurality of suction members to hold or release the workpiece.

5. The turning mechanism of claim 1, wherein the rotating member defines an engaging groove along a peripheral surface thereof, the turning assembly further comprises a supporting member, the supporting member comprises a main body slidably mounted on the supporting bracket and a resisting portion protruding form the main body, the resisting portion extends through the turning member and engages into the engaging groove of the rotating member, thereby supporting the rotating member, the supporting member is capable of simultaneously following the rotating member moving along the axial direction of the transmission rod.

6. The turning mechanism of claim 5, wherein the resisting portion defines a concave resisting surface at an end thereof away from the main body, the concave resisting surface abuts against a bottom of the engaging groove.

7. The turning mechanism of claim 1, wherein the supporting bracket comprise a base seat, a first support frame and a second support frame, the first support frame and the second support frame are assembled to opposite sides of the base seat, the turning mechanism further comprises a first transferring pallet movably mounted on the first support frame and a second transferring pallet movably mounted on the second support frame.

8. The turning mechanism of claim 7, wherein the first support frame comprises a pair of first supporting rods extending from opposite ends of the base seat toward a side of the base seat, the second support frame comprises a mounting plate and a pair of second supporting rods, the pair of second supporting rods extend from opposite ends of the base seat toward a side of the base seat opposite to the first support frame, the mounting plate is arranged parallel to the base seat and fixed to the base seat, the first transferring pallet is movably mounted on the pair of first supporting rods and the second transferring pallet is movably mounted on the pair of second supporting rods.

9. The turning mechanism of claim 8, wherein a pair of receiving portions is symmetrically mounted on the mounting plate, each receiving portion defines a receiving groove facing the other receiving portion, the two receiving grooves of the pair of receiving portions cooperatively form a receiving space for partially receiving the workpiece.

10. A turning mechanism for turning over workpieces, comprising:
   a supporting bracket;
   a first transferring pallet movable mounted on the supporting bracket;
   a second transferring pallet movably mounted on the supporting bracket and being configured opposite to the first transferring pallet;
   a turning assembly located between the first transferring pallet and the second transferring pallet, the turning assembly comprising a first driving member mounted on the supporting bracket and a turning member connected to the first driving member; and
   a suction assembly partially mounted on the turning member;
   wherein the suction assembly is capable of suction-adhering the workpiece from the first transferring pallet, thereby holding the workpiece on the turning member, the first driving member is capable of rotating the turning member to turn over the workpiece, and releasing the workpiece on the second transferring pallet.

11. The turning mechanism of claim 10, wherein the first driving member comprises a fixing portion, a driving portion, a transmission rod and a rotating member, the fixing portion is fixed to supporting bracket, the driving portion is fittingly assembled to the fixing portion, the transmission rod extends through the fixing portion and is connected to the driving portion, the rotating member is movably mounted on the transmission rod, the driving portion drives the transmission rod to rotate the rotating member.

12. The turning mechanism of claim 11, wherein the suction assembly comprises a plurality of suction members and a second driving member connected to the plurality of suction members, the plurality of suction members are separately mounted on the turning member, the second driving member is mounted on the supporting bracket, the fixing portion defines an extending hole thereon, and the transmission rod extends through the extending hole to connect with the driving portion, the rotating member is sleeved on the transmission rod and capable of moving along an axial direction of the transmission rod.

13. The turning mechanism of claim 11, wherein the turning member comprises loading portion and a pair of connecting portions protruding from a side of the loading portion, the plurality of suction members is mounted on the loading portion, the pair of connecting portions is spaced from each other and fixed to the rotating member.

14. The turning mechanism of claim 11, further comprising a controller, the controller is mounted on the supporting bracket and is electrically connected to the first driving member and the second driving member, thereby controlling the turning member to turn over the workpiece and controlling the plurality of suction members to hold or release the workpiece.

15. The turning mechanism of claim 11, wherein the rotating member defines an engaging groove along a peripheral surface thereof, the turning assembly further comprises a supporting member, the supporting member comprises a main body slidably mounted on the supporting bracket and a resisting portion protruding form the main body, the resisting portion extends through the turning member and engages into the engaging groove of the rotating member, thereby supporting the rotating member, the supporting member is capable of simultaneously following the rotating member moving along the axial direction of the transmission rod.

16. The turning mechanism of claim 15, wherein the resisting portion defines a concave resisting surface at an end thereof away from the main body, the concave resisting surface abuts against a bottom of the engaging groove.

17. The turning mechanism of claim 10, wherein the supporting bracket comprise a base seat, a first support frame and a second support frame, the first support frame and the second support frame are assembled to opposite sides of the base seat, the first transferring pallet is movably mounted on the first support frame and the second transferring pallet is movably mounted on the second support frame.

18. The turning mechanism of claim 17, wherein the first support frame comprises a pair of first supporting rods extending from opposite ends of the base seat toward a side of the base seat, the second support frame comprises a mounting plate and a pair of second supporting rods, the pair of second supporting rods extend from opposite ends of the base seat toward a side of the base seat opposite to the first support frame, the mounting plate is arranged parallel to the base seat and fixed to the base seat, the first transferring pallet is movably mounted on the pair of first supporting rods and the second transferring pallet is movably mounted on the pair of second supporting rods.

19. The turning mechanism of claim 18, wherein a pair of receiving portions is symmetrically mounted on the mounting plate, each receiving portion defines a receiving groove facing the other receiving portion, the two receiving grooves of the pair of receiving portions cooperatively form a receiving space for partially receiving the workpiece.

* * * * *